HIRAM B. WELLMAN, OF INDIANAPOLIS, INDIANA.

Letters Patent No. 70,054, dated October 22, 1867.

IMPROVED COMPOSITION FOR TREATING BURNING-FLUID.

*The Schedule referred to in these Letters Patent and making part of the same.*

TO ALL WHOM IT MAY CONCERN:

Be it known that I, HIRAM B. WELLMAN, of Indianapolis, in the county of Marion, and State of Indiana, have invented a new and useful improvement in Composition for Treating Burning-Fluids; and I do hereby declare the following to be a full, clear, and exact description thereof.

My invention consists in a preparation of soda-ash, or Epsom salts, gum-Arabic, or other resinous gum, which is to be mixed with hydrocarbon oils, or their products or compounds, such as benzine, gasoline, etc., when used as burning-fluids for illuminating purposes, for the purpose of increasing their illuminating properties, and also for the purpose of rendering them, or the vapors produced from them, non-explosive, except at a temperature to which, in such uses, they are seldom if ever raised.

The hydrocarbons, it is well known, above named, vaporize at comparatively low temperatures; and it is also well known that they, as well as the vapors which they give off, are in their natural state combustible and explosive when brought in contact with flame. I do not propose to change materially the point at which such hydrocarbons begin to be converted into vapor, nor to render them nor their vapors non-inflammable at their present respective temperatures of combustion; but what I do propose by my invention, and what I accomplish, is to render them less subject to give off explosive vapors or gases at any temperature to which they are liable to be raised by being burned in lamps for illuminating purposes.

At present the more volatile products of the distillation of petroleum, such as benzine, naphtha, gasoline, etc., are of little or no commercial value on account of their extreme volatility, and their liability to explode at a low temperature, consequently such process of distillation involves a considerable waste. But by treating the oil previous to distillation with the ingredients above named, I render the oil itself, while still retaining its volatile products, non-explosive, and hence useful and safe for purposes of illumination. This result I effect by means of a mixture of ingredients, which is added to the oil, benzine, gasoline, etc., and dissolved therein without the application of heat. The proportion of the ingredients to be used will vary somewhat with the specific gravity of the hydrocarbon fluid to which it is to be applied.

The use of the distinguishing terms, carbon oil, naphtha, benzine, gasoline, etc., as applied to petroleum and its products, is somewhat arbitrary, but depends on the specific gravity of these various substances, as tested by Baume's hydrometer, as follows: Carbon oil is of the density of 59° and downwards; benzine ranges from 59° to 64°; naphtha, from 64° to 70°; and gasoline, from 70° upwards.

The mixture which I employ, as already stated, consists of soda-ash, or Epsom salts, and gum-Arabic, or gum-tamarack, or white-pine gum, and with which I sometimes use alum or gum-camphor for oil of about the gravity of 60° Baume, and to each barrel of forty gallons I use three pounds of soda-ash and one pound of gum-Arabic, or its equivalent of other resinous gum. These ingredients are mixed together, and, in the shape of coarse powder, added to the oil, and the mixture is left to stand from twenty-four to forty hours, or so long as may be necessary to effect their solution, for which purpose the application of heat is not necessary. For the soda-ash two pounds of Epsom salts (sulphate of magnesia) may be substituted. The mixture thus produced burns with a steady, brilliant, white light, much superior to that produced by the ordinary carbon oil, and while it is readily ignited, it will not explode even when heated to a temperature far above that of the legal "fire-test," so called, as already stated. I thus utilize what are now generally regarded as the waste products of distillation, and products, too, which, but for their liability to explode, would possess a high commercial value.

The fact that such oils ignite at a low temperature, and readily give off vapors which also are combustible, is, with my invention, no objection whatever, but rather the reverse. The lower the burning point the more remote becomes the possibility of heating them to a temperature which would generate an explosive gas. If used with the lighter products of carbon oil, such as benzine, gasoline, etc., the quantity of the mixture to each barrel of fluid must be proportionately increased.

The mixture described, before being used, may, if desirable, be colored in the usual way, as by gamboge for yellow, alkanet root for red, etc. It may also be flavored at pleasure with any essential oil.

My mixture will also subserve the same important ends as applied to the mixture of turpentine and alcohol, known as camphene, rendering it practically non-explosive.

What I claim as my invention, and desire to secure by Letters Patent, is—

A composition consisting of soda-ash, or Epsom salts, and gum-Arabic, or gum-tamarack, or white-pine gum, and with or without alum or gum-camphor, for mixing with and dissolving in carbon oil, benzine, or other hydrocarbon burning-fluids, for the purposes substantially as hereinbefore set forth and described.

In testimony whereof I, the said HIRAM B. WELLMAN, have hereunto set my hand in presence of—

HIRAM B. WELLMAN.

Witnesses:
A. S. NICHOLSON,
GEO. H. CHRISTY.